(12) United States Patent  
Hellman

(10) Patent No.: US 7,680,351 B2  
(45) Date of Patent: Mar. 16, 2010

(54) VIDEO DEBLOCKING METHOD AND APPARATUS

(75) Inventor: Timothy Hellman, Concord, MA (US)

(73) Assignee: Broadcom Corporation

( * ) Notice: Subject to any disclaimer, the term of this patent is extended or adjusted under 35 U.S.C. 154(b) by 1309 days.

(21) Appl. No.: 10/965,172

(22) Filed: Oct. 13, 2004

(65) Prior Publication Data

US 2005/0259887 A1    Nov. 24, 2005

Related U.S. Application Data

(60) Provisional application No. 60/573,108, filed on May 21, 2004.

(51) Int. Cl.
*G06K 9/40* (2006.01)

(52) U.S. Cl. .................................. 382/254

(58) Field of Classification Search ......... 382/232–254, 382/264; 348/384.1–440.1, 606–624; 708/203; 358/426.01–426.16; 345/555; 375/122, 375/240.01–240.29
See application file for complete search history.

(56) References Cited

U.S. PATENT DOCUMENTS

| | | | | |
|---|---|---|---|---|
| 5,625,714 A | * | 4/1997 | Fukuda | 382/233 |
| 5,787,204 A | * | 7/1998 | Fukuda | 382/233 |
| 6,229,929 B1 | * | 5/2001 | Lynch et al. | 382/268 |
| 6,748,113 B1 | * | 6/2004 | Kondo et al. | 382/232 |
| 7,088,844 B2 | * | 8/2006 | Hannigan et al. | 382/100 |
| 7,330,596 B2 | * | 2/2008 | Suino et al. | 382/240 |
| 2002/0168113 A1 | * | 11/2002 | Nakayama | 382/240 |
| 2005/0002570 A1 | * | 1/2005 | Clark et al. | 382/199 |

* cited by examiner

*Primary Examiner*—Samir A. Ahmed  
*Assistant Examiner*—Atiba O Fitzpatrick  
(74) *Attorney, Agent, or Firm*—McAndrews, Held & Malloy, Ltd.

(57) ABSTRACT

Methods and systems for processing pixels within a current macroblock are disclosed. Aspects of the method may comprise acquiring a plurality of pixels that are adjacent to the left of a plurality of selected pixels within the current macroblock. A portion of the plurality of selected pixels within the current macroblock may be filtered along a vertical edge utilizing a portion of the acquired plurality of pixels that are adjacent to the left of the plurality of selected pixels. The at least a portion of said filtered plurality of selected pixels within the current macroblock may be rotated. The current macroblock may be filtered along a horizontal edge, utilizing at least a portion of the rotated plurality of selected pixels.

30 Claims, 9 Drawing Sheets

VIDEO DEBLOCKING METHOD AND APPARATUS

RELATED APPLICATIONS

This application makes reference to, claims priority to, and claims the benefit of U.S. Provisional Patent Application 60/573,108, filed on May 21, 2004 and entitled "Video Deblocking Method And Apparatus," the complete subject matter of which is hereby incorporated herein by reference in its entirety.

This application is related to the following applications, each of which is incorporated herein by reference in its entirety for all purposes:

U.S. patent application Ser. No. 11/000,731 filed Dec. 1, 2004;
U.S. patent application Ser. No. 10/963,677 filed Oct. 13, 2004;
U.S. patent application Ser. No. 10/985,501 filed Nov. 10, 2004;
U.S. patent application Ser. No. 11/112,632 filed Apr. 22, 2005;
U.S. patent application Ser. No. 10/985,110 filed Nov. 10, 2004;
U.S. patent application Ser. No. 10/972,931 filed Oct. 25, 2004;
U.S. patent application Ser. No. 10/974,179 filed Oct. 27, 2004;
U.S. patent application Ser. No. 10/974,872 filed Oct. 27, 2004;
U.S. patent application Ser. No. 10/970,923 filed Oct. 21, 2004;
U.S. patent application Ser. No. 10/963,680 filed Oct 13, 2004;
U.S. patent application Ser. No. 11/013,768 filed Dec. 16, 2004;
U.S. patent application Ser. No. 11/102,389 filed Apr. 8, 2005;
U.S. patent application Ser. No. 11/135,929 filed May 23, 2004; and
U.S. patent application Ser. No. 11/000,676 filed Dec. 1, 2004.

FEDERALLY SPONSORED RESEARCH OR DEVELOPMENT

Not Applicable

MICROFICHE/COPYRIGHT REFERENCE

Not Applicable

BACKGROUND OF THE INVENTION

The ITU-H.264 Standard (H.264), also known as MPEG-4, Part 10, and Advanced Video Coding (AVC), may encode a video stream on a frame-by-frame basis, and may encode video frames on a macroblock-by-macroblock basis. The MPEG-4 standard may specify the use of spatial prediction, temporal prediction, discrete cosine transformation (DCT), interlaced coding and/or lossless entropy coding, for example, to compress macroblocks within a video stream.

The MPEG4 video compression standard may be utilized to encode video information on a macroblock-by-macroblock basis. During encoding of video information utilizing the MPEG-4 standard, for example, prediction error information may be encoded together with prediction mode information, as well as with other side information necessary for the decoding process. In order to encode the prediction error information, a discrete cosine transformation may be applied to transform the prediction error information into frequency domain coefficients prior to encoding. During the encoding and the transformation processes within a video encoder, certain information relating to the prediction error, for example, may be lost.

As a result of the lost or missing information, the quality of the decoded video signal may be decreased. After quantized frequency coefficients are transformed back to prediction error information and a macroblock is reconstructed, certain artifacts may appear in the decoded video stream. More specifically, transform blockiness may appear in the decoded video in the form of square grid artifacts, for example. Artifacts other than blockiness may also appear in the decoded video stream due to missing video information. Transform blockiness may be associated with missing pixel information along one or more horizontal and/or vertical borders, or edges, between neighboring macroblocks.

In video systems utilizing blocks of video information, a video deblocker may be utilized to smooth the visual transition between adjacent video blocks. However, conventional methods of deblocking a decoded video stream utilized, for example, in an MPEG4 environment with macroblock adaptive frame/field (MBAFF) coding, are time-consuming and inefficient. Conventional methods of deblocking typically process a macroblock within a decoded video stream on a pixel-by-pixel basis. In this manner, a single pixel is processed during one operational cycle, or one processor clock cycle, which is time-consuming and reduces the efficiency during video processing.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Certain embodiments of the invention may be found in a method and system for processing pixels within a current macroblock. Aspects of the method may comprise acquiring a plurality of pixels that are adjacent to the left of a plurality of selected pixels within the current macroblock. A portion of the plurality of selected pixels within the current macroblock may be filtered along a vertical edge utilizing a portion of the acquired plurality of pixels that are adjacent to the left of the plurality of selected pixels. The at least a portion of said filtered plurality of selected pixels within the current macroblock may be rotated. The current macroblock may be filtered along a horizontal edge, utilizing at least a portion of the rotated plurality of selected pixels.

A plurality of pixels that are adjacent to the top of the plurality of selected pixels may be acquired within the current macroblock. The acquired plurality of pixels that are adjacent to the top of the plurality of selected pixels may be rotated. At least a portion of the plurality of selected pixels within the current macroblock may be filtered along a horizontal edge utilizing at least a portion of the rotated plurality of pixels that are adjacent to the top of the plurality of selected pixels. The acquired plurality of pixels and/or the plurality of selected pixels within the macroblock may comprise at least 4 pixels. At least a portion of the plurality of selected pixels filtered along the vertical edge may be stored.

A plurality of pixels that are adjacent to the right of the stored at least a portion of the plurality of selected pixels may be acquired. The acquired plurality of pixels that are adjacent to the right of the stored at least a portion of the plurality of selected pixels may be stored. At least a portion of the stored acquired plurality of pixels that are adjacent to the right of the stored selected pixels may be filtered along a subsequent vertical edge utilizing at least a portion of the stored selected pixels.

Another embodiment of the invention may provide a machine-readable storage, having stored thereon, a computer program having at least one code section executable by a machine, thereby causing the machine to perform the steps as described above for processing pixels within a current macroblock.

Aspects of the system may comprise at least one processor that acquires a plurality of pixels that are adjacent to the left of a plurality of selected pixels within the current macroblock. The processor may filter along a vertical edge at least a portion of the plurality of selected pixels within the current macroblock utilizing at least a portion of the acquired plurality of pixels that are adjacent to the left of the plurality of selected pixels. The acquired plurality of pixels that are adjacent to the left of the plurality of selected pixels may be rotated by the processor. The processor may then filter along a horizontal edge at least a portion of the plurality of selected pixels within the current macroblock utilizing at least a portion of the rotated plurality of pixels that are adjacent to the left of the plurality of selected pixels.

A plurality of pixels that are adjacent to the top of the plurality of selected pixels within the current macroblock may be acquired by the processor. The processor may rotate the acquired pixels that are adjacent to the top of the selected pixels and may filter along a horizontal edge, at least a portion of the selected pixels within the current macroblock utilizing at least a portion of the rotated pixels that are adjacent to the top of the selected pixels. The acquired pixels and/or the selected pixels within the macroblock may comprise at least 4 pixels.

The processor may be adapted to store the at least a portion of the plurality of selected pixels filtered along the vertical edge and may acquire a plurality of pixels that are adjacent to the right of the stored at least a portion of the plurality of selected pixels. In this regard, the processor may store the acquired plurality of pixels that are adjacent to the right of the stored at least a portion of the plurality of selected pixels and may filter along a subsequent vertical edge at least a portion of the stored acquired plurality of pixels that are adjacent to the right of the stored selected pixels utilizing at least a portion of the stored selected pixels.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the invention may be found in a method and system for processing pixels within a current macroblock. More specifically, transform blockiness within a decoded video stream may be reduced by deblocking the decoded video stream. The deblocking may comprise processing pixels on a macroblock-by-macroblock basis in a current and/or neighboring macroblocks. In a different aspect of the invention, pixels within a macroblock may be grouped into sub-blocks and the deblocking may be achieved by processing pixels on a sub-block-by-sub-block basis. For example, a current sub-block, within a current macroblock, may comprise 16 pixels in a 4×4 pixel matrix. Transform blockiness along a vertical macroblock edge may be reduced by filtering pixels within the current sub-block together with pixels within a sub-block to the left of the current sub-block. Transform blockiness along a horizontal macroblock edge may be reduced by filtering pixels within the current sub-block together with pixels within a sub-block to the top of the current sub-block. During deblocking, a plurality of pixels, rather than a single pixel, may be processed during one operational cycle, or one processor clock cycle. In this manner, a decoded video stream may be deblocked faster and more efficiently.

Figure 1A:
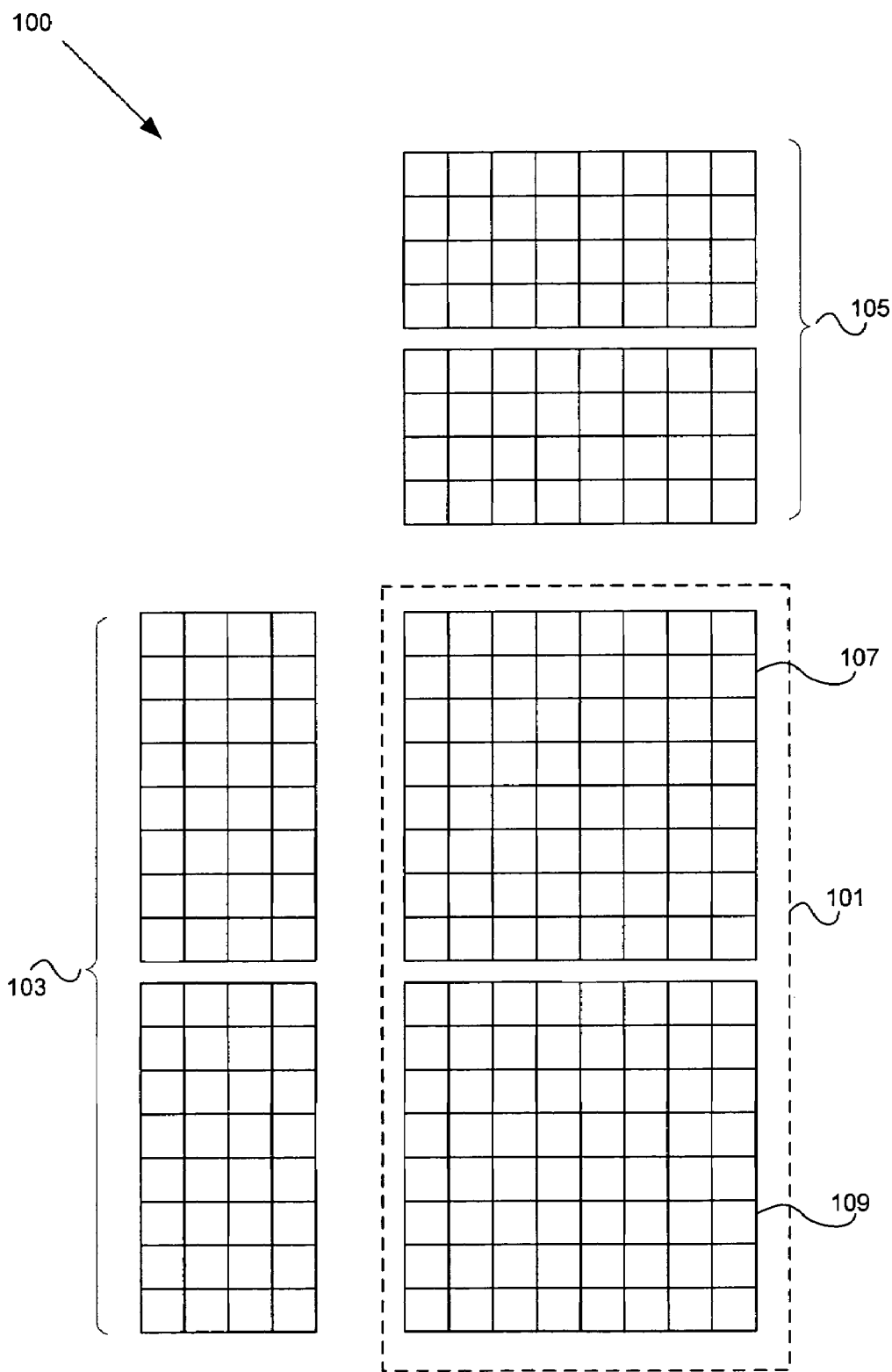
FIG. 1A is a diagram illustrating an exemplary video block and pixel information from adjacent blocks that may be utilized to process pixels within a current macroblock pair, in accordance with an embodiment of the invention.

FIG. 1A is a diagram 100 illustrating an exemplary video block and pixel information from adjacent blocks that may be utilized to process pixels within a current macroblock pair, in accordance with an embodiment of the invention. Referring to FIG. 1, current macroblock pair 101 may comprise macroblocks 107 and 109. Macroblock pair 103 may be located to the left of current macroblock pair 101 and macroblock pair 105 may be located to the top of current macroblock pair 101. Macroblock pairs 103 and 105 may each comprise a portion of, for example, a 16×16 pixel macroblock.

In one aspect of the invention, during an exemplary deblocking processing scenario, left side pixel information within the current macroblock pair 101 or within a neighboring macroblock may be processed, or filtered, to generate a relatively smooth visual transition at one or more vertical edges within the current macroblock pair 101. The left side pixel information may comprise pixel information within the current macroblock pair 101 and/or pixel information within the macroblock pair 103 located to the left of the current macroblock pair 101. Similarly, top side pixel information within the current macroblock pair 101 or within a neighboring macroblock may be processed, or filtered, to generate a relatively smooth visual transition at one or more horizontal edges within the current macroblock pair 101. The top side pixel information may comprise pixel information within the current macroblock pair 101 and/or pixel information within the macroblock pair 105 located to the top of the current macroblock pair 101.

For example, information of pixels in the left adjacent macroblock pair 103 ("left-side pixels") and information of pixels in the present macroblock pair 101 may be filtered to generate a relatively smooth video transition at the left vertical edge of the present macroblock pair 101. Information of pixels in the top adjacent macroblock pair 105 ("top-side pixels") may be processed with information of pixels in the present macroblock pair 101 to generate a relatively smooth video transition at the top edge of the present macroblock pair 101.

Figure 1B:
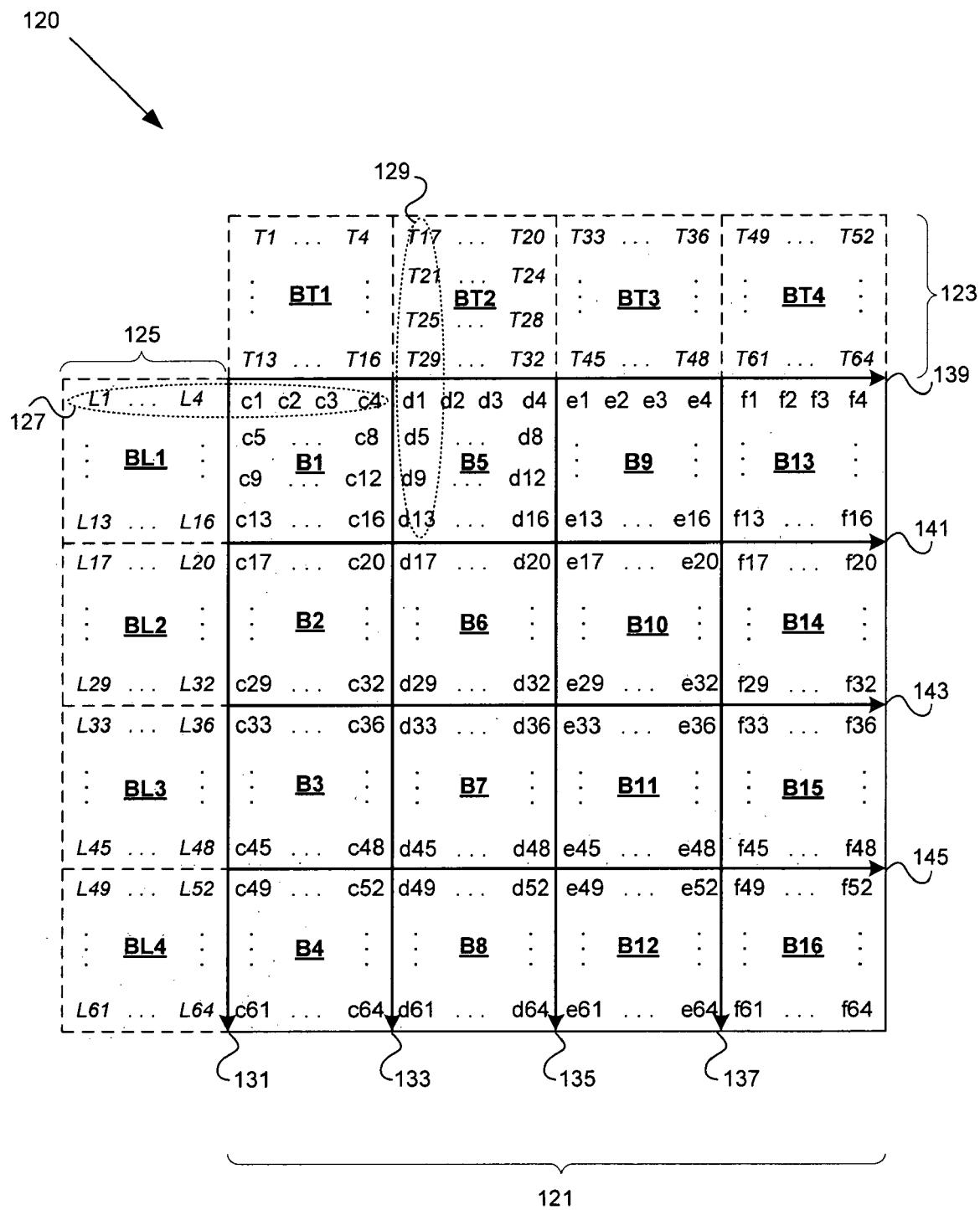
FIG. 1B is a diagram illustrating an exemplary macroblock and adjacent pixels to the top and to the left that may be utilized during deblocking, in accordance with an embodiment of the invention.

FIG. 1B is a diagram 120 illustrating an exemplary macroblock and adjacent pixels to the top and to the left that may be utilized during deblocking, in accordance with an embodiment of the invention. Referring to FIG. 1B, there is illustrated a current macroblock 121, a macroblock portion, or a sub-block, 123 that is adjacent to the top of the current macroblock 121, and a sub-block 125 that is adjacent to the left of the current macroblock 121.

The current macroblock 121 may comprise a plurality of pixels which may be divided into a plurality of 4×4 sub-blocks within the current macroblock 121. For example, the current macroblock may comprise 256 pixels and may be divided into 16 sub-blocks, B1 through B16, each comprising 16 pixels in a 4×4 pixel matrix. The current macroblock 121 may also be divided into a plurality of vertical sub-blocks and/or a plurality of horizontal sub-blocks. For example, the current macroblock 121 may be divided into four 4×16 pixels vertical sub-blocks comprising any of the following 4×4 sub-block configurations: {B1; B2; B3; B4}, {B5; B6; B7; B8}, {B9; B10; B11; B12} and {B13; B14; B15; B16}. Similarly, current macroblock 121 may also be divided into, for example, four 16×4 pixels horizontal sub-blocks comprising any of the following 4×4 sub-block configurations: {B1; B5; B9; B13}, {B2; B6; B10; B14}, {B3; B7; B11; B15} and {B4; B8; B12; B16}.

The macroblock portion 123 may comprise a 16×4 pixels horizontal sub-block. The horizontal sub-block 123 may comprise 4×4 pixels sub-blocks BT1, BT2, BT3 and BT4 that are adjacent to the top of sub-blocks B1, B5, B9 and B13, respectively. Similarly, the macroblock portion 125 may comprise a 4×16 pixels vertical sub-block. The vertical sub-block 125 may comprise 4×4 pixels sub-blocks BL1, BL2, BL3 and BL4 that are adjacent to the left of sub-blocks B1, B2, B3 and B4, respectively.

In accordance with an aspect of the invention, macroblock 121 may be deblocked by filtering pixels along the vertical edges 131, 133, 135 and 137 of the current macroblock 121, as well as by filtering pixels along the horizontal edges 139, 141, 143 and 145 of the current macroblock 121. More specifically, groups of pixels from neighboring sub-blocks on both sides of a horizontal or vertical edge may be filtered in one operational cycle. Deblocking of the entire macroblock 121 may be achieved by first deblocking along vertical edges 131, 133, 135 and 137, and deblocking along horizontal edges 139, 141, 143 and 145.

During deblocking along the first vertical edge 131, groups of four pixels in each of the sub-blocks B1, B2, B3 and B4 may be filtered together with corresponding groups of four pixels from each of the left adjacent sub-blocks BL1, BL2, BL3 and BL4, respectively. In this manner, horizontal pixel groups comprising pixels on both sides of the vertical edge 131 may be filtered to deblock along the vertical edge 131. For example pixels {c1; c2; c3; c4} from sub-block B1 may be grouped with pixels {L1; L2; L3; L4} to form a horizontal pixel group 127. Since each of the sub-blocks B1, B2, B3 and B4 comprise 16 pixels, a total of 16 horizontal pixel groups may be utilized and filtered to deblock along the vertical edge 131.

During deblocking along any of the remaining vertical edges 133, 135 and/or 137, horizontal pixel groups within the current macroblock 121 may be filtered to deblock along these vertical edges. For example, with regard to deblocking along the second vertical edge 133, horizontal pixel groups may be formed by grouping four horizontally spaced pixels in each of the sub-blocks B5, B6, B7 and B8 with corresponding four horizontally spaced pixels in each of the left adjacent sub-blocks B1, B2, B3 and B4, respectively. Similarly, with regard to deblocking along vertical edge 135, horizontal pixel groups may be formed by grouping four horizontally spaced pixels in each of the sub-blocks B9, B10, B11 and B12 with corresponding four horizontally spaced pixels in each of the left adjacent sub-blocks B5, B6, B7 and B8, respectively. With regard to deblocking along vertical edge 137, horizontal pixel groups may be formed by grouping four horizontally spaced pixels in each of the sub-blocks B13, B14, B15 and B16 with corresponding four horizontally spaced pixels in each of the left adjacent sub-blocks B9, B10, B11 and B12, respectively.

After deblocking along the vertical edges 131, 133, 135 and 137, the current macroblock 121 may be deblocked along the horizontal edges 139, 141, 143 and 145. During deblocking along the first horizontal edge 139, groups of four pixels in each of the sub-blocks B1, B5, B9 and B13 may be filtered together with corresponding groups of four pixels from each of the top adjacent sub-blocks BT1, BT2, BT3 and BT4, respectively. In this manner, vertical pixel groups comprising pixels on both sides of the horizontal edge 139 may be filtered to deblock along the horizontal edge 139. For example, pixels {d1; d5; d9; d13} from sub-block B5 may be grouped with pixels {T17; T21; T25; T29} to form a vertical pixel group 129. Since each of the sub-blocks B1, B5, B9 and B13 comprise 16 pixels, a total of 16 vertical pixel groups may be utilized and filtered to deblock along the horizontal edge 139.

During deblocking along any of the remaining horizontal edges 141, 143 and/or 145, vertical pixel groups within the current macroblock 121 may be filtered to deblock along the horizontal edges. For example, with regard to deblocking along the second horizontal edge 141, vertical pixel groups may be formed by grouping four vertically spaced pixels in each of the sub-blocks B2, B6, B10 and B14 with corresponding four vertically spaced pixels in each of the top adjacent sub-blocks B1, B5, B9 and B13, respectively. Similarly, with regard to deblocking along horizontal edge 143, vertical pixel groups may be formed by grouping four vertically spaced pixels in each of the sub-blocks B3, B7, B11 and B15 with corresponding four vertically spaced pixels in each of the top adjacent sub-blocks B2, B6, B10 and B14, respectively. With regard to deblocking along horizontal edge 145, vertical pixel groups may be formed by grouping four vertically spaced pixels in each of the sub-blocks B4, B8, B12 and B16 with corresponding four vertically spaced pixels in each of the top adjacent sub-blocks B3, B7, B11 and B15, respectively.

In one aspect of the invention, pixels within the current macroblock 121 may be filtered on a pixel group by pixel group basis. For example, eight pixels within each vertical or horizontal pixel groups may be filtered during one operational cycle of deblocking. One operational cycle of deblocking may correspond to one clock cycle in a deblocking system, such as the deblocking system described on FIG. 3.

Figure 2A:
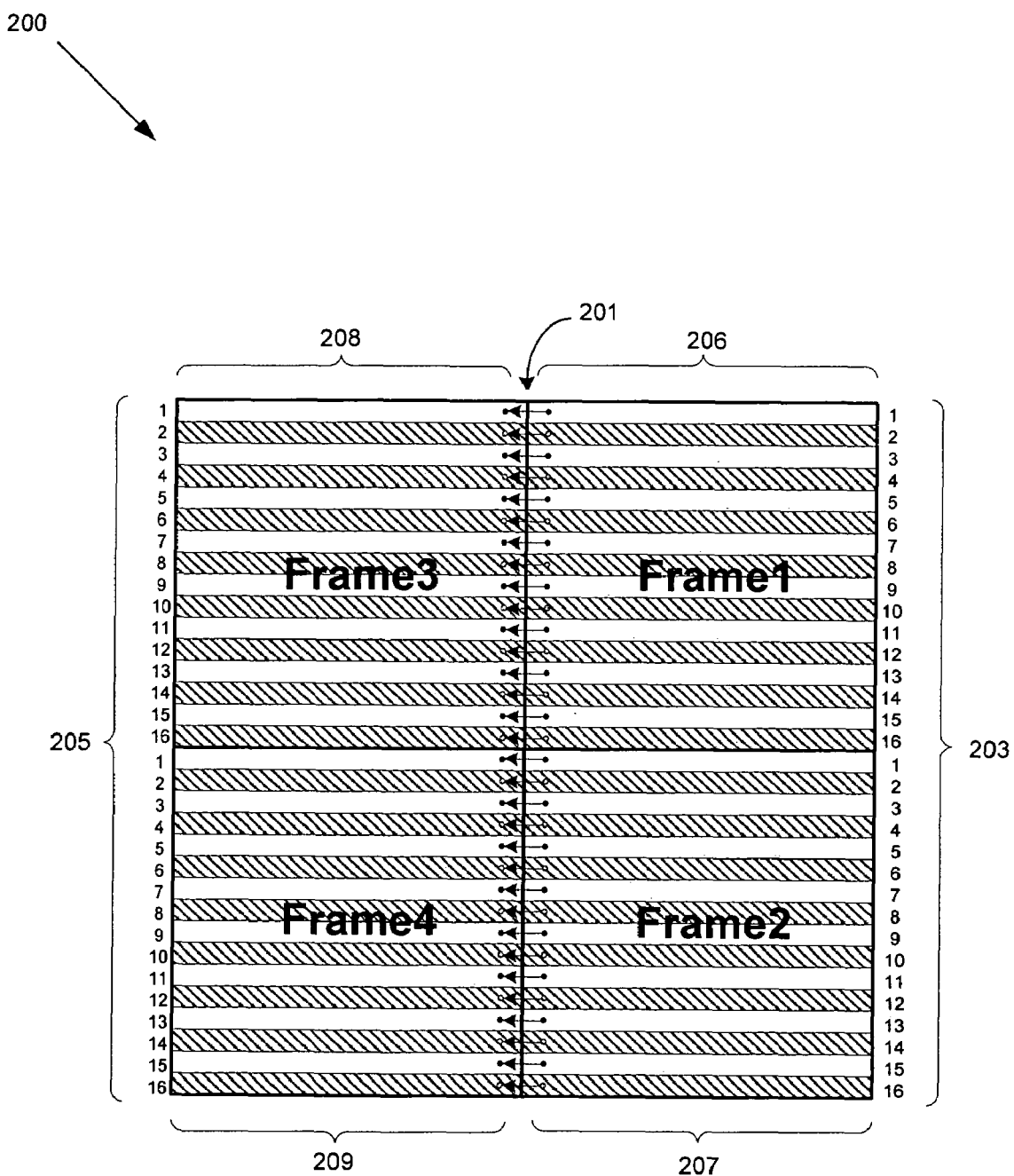
FIG. 2A is a diagram illustrating pixel processing along a vertical edge between pixels in a frame coded macroblock pair and a frame coded left neighboring macroblock pair, in accordance with an embodiment of the invention.

FIG. 2A is a diagram 200 illustrating pixel processing along a vertical edge between pixels in a frame coded macroblock pair and a frame coded left neighboring macroblock pair, in accordance with an embodiment of the invention. Referring to FIG. 2A, there is illustrated a current macroblock pair 203 and a previous macroblock pair 205, which is adjacent to the left of the current macroblock pair 203 along its vertical edge 201. Macroblock pair 203 may comprise macroblocks 206 and 207, and macroblock pair 205 may comprise macroblocks 208 and 209.

In one aspect of the invention, each macroblock 206, 207, 208 and 209 may be frame coded during encoding, in accordance with macroblock adaptive frame/field (MBAFF) encoding techniques. MBAFF encoding is more fully described in U.S. patent application Ser. No. 10/963,677 filed Oct. 13, 2004, which is incorporated herein by reference in its entirety. For example, all macroblocks 206, 207, 208 and 209 may be frame coded during encoding and pixels in all odd and even numbered rows may be of the same type. Since macroblocks 206 through 209 are frame encoded, odd numbered lines in macroblocks 206 and 207 correspond to odd numbered lines in macroblocks 208 and 209. Similarly, even numbered lines in macroblocks 206 and 207 correspond to even numbered lines in macroblocks 208 and 209. Vertical edge 201, therefore, may be deblocked by filtering corresponding type pixels on both sides of the vertical edge 201 in corresponding odd or even numbered pixel rows.

Figure 2B:
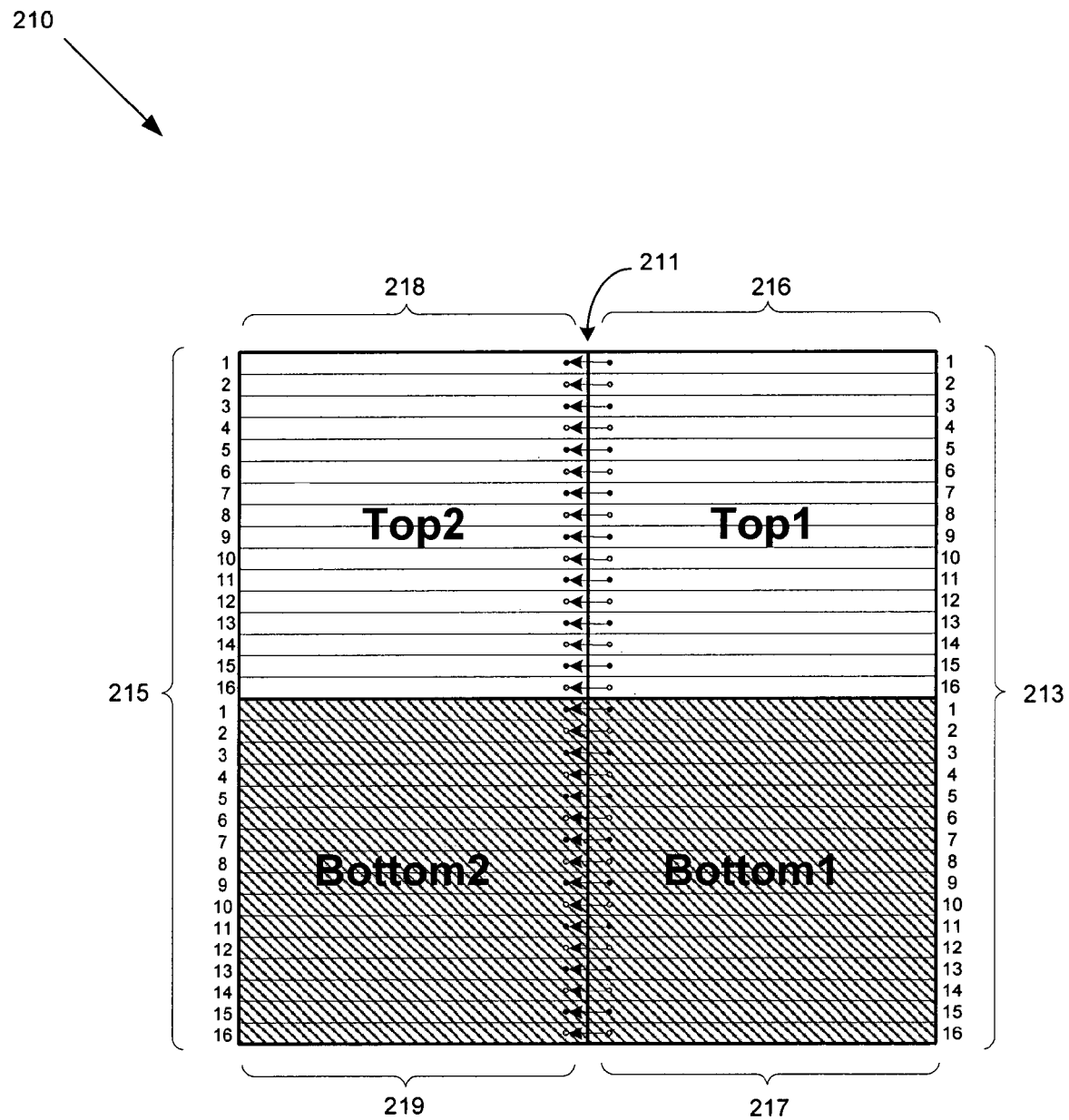
FIG. 2B is a diagram illustrating pixel processing along a vertical edge between pixels in a top-bottom field coded macroblock pair and a top-bottom field coded left neighboring macroblock pair, in accordance with an embodiment of the invention.

FIG. 2B is a diagram 210 illustrating pixel processing along a vertical edge between pixels in a top-bottom field coded macroblock pair and a top-bottom field coded left neighboring macroblock pair, in accordance with an embodiment of the invention. Referring to FIG. 2B, there is illustrated a current macroblock pair 213 and a previous macroblock pair 215, which is adjacent to the left of the current macroblock pair 213 along its vertical edge 211. Macroblock pair 213 may comprise macroblocks 216 and 217, and macroblock pair 215 may comprise macroblocks 218 and 219.

Figure 2C:
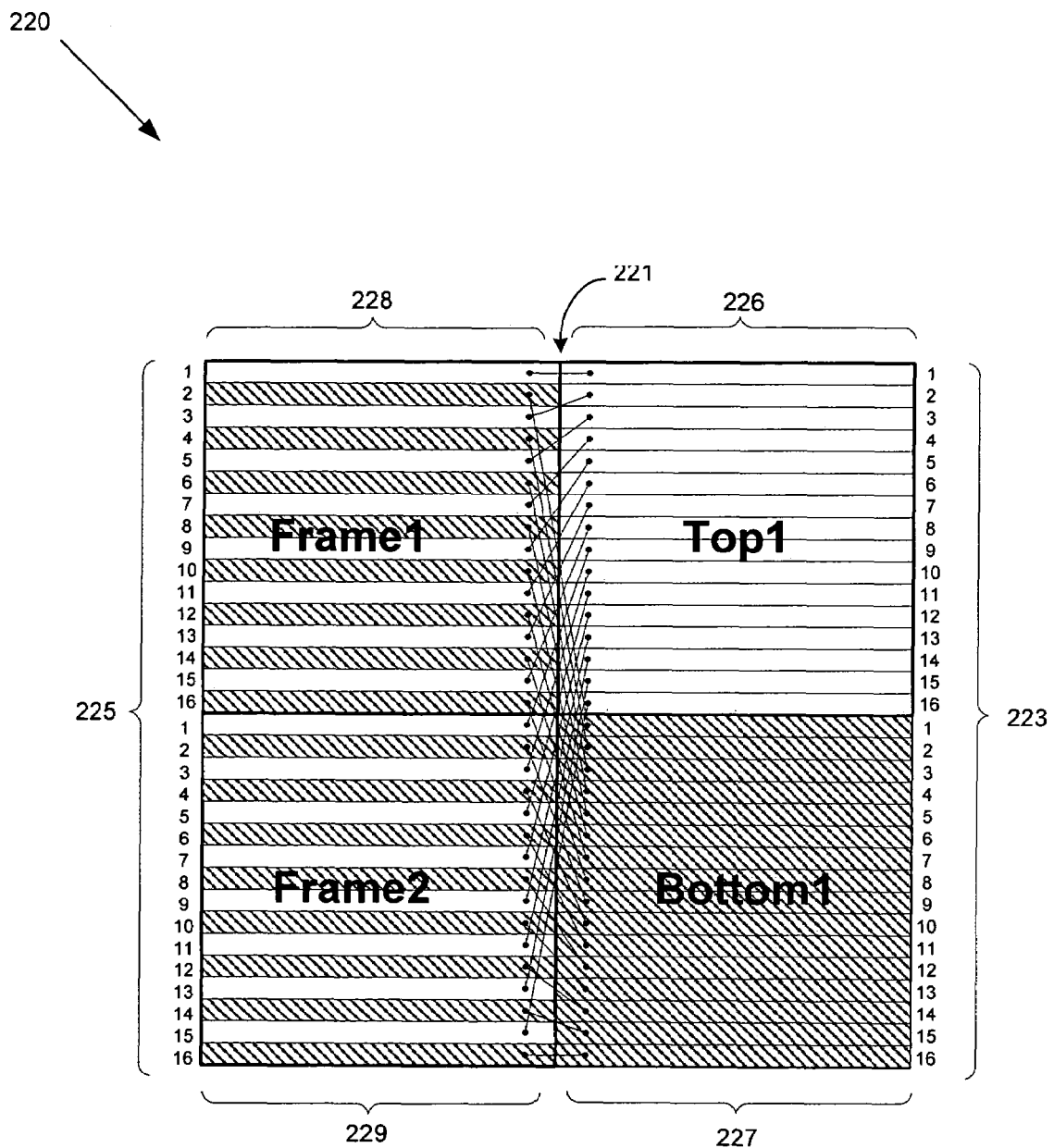
FIG. 2C is a diagram illustrating pixel processing along a vertical edge between pixels in a top-bottom field coded macroblock pair and a frame coded left neighboring macroblock pair, in accordance with an embodiment of the invention.

In one aspect of the invention, each macroblock 216, 217, 218 and 219 may be field coded during encoding in accordance with MBAFF coding techniques. For example, macroblocks 216 and 218 may be encoded with a top field and macroblocks 217 and 219 may be encoded with a bottom field during MBAFF encoding. Since macroblocks 216 and 218 are of the same type, i.e., top field encoded, pixels along the vertical edge 211 from pixel rows 1 through 16 in macroblock 216 may correspond to pixels along the vertical edge 211 from pixel rows 1 through 16 in macroblock 218. Similarly, since macroblocks 217 and 219 are of the same type, i.e., bottom field encoded, pixels along the vertical edge 211 from pixel rows 1 through 16 in macroblock 217 may correspond to pixels along the vertical edge 211 from pixel rows 1 through 16 in macroblock 219. Vertical edge 211, therefore, may be deblocked by filtering corresponding type pixels on both sides of the vertical edge 211 in the corresponding top and bottom encoded macroblocks FIG. 2C is a diagram 220 illustrating pixel processing along a vertical edge between pixels in a top-bottom field coded macroblock pair and a frame coded left neighboring macroblock pair, in accordance with an embodiment of the invention. Referring to FIG. 2C, there is illustrated a current macroblock pair 223 and a previous macroblock pair 225, which is adjacent to the left of the current macroblock pair 223 along its vertical edge 221. Macroblock pair 223 may comprise macroblocks 226 and 227, and macroblock pair 225 may comprise macroblocks 228 and 229.

In one aspect of the invention, macroblocks 226 and 227 may be field coded and macroblocks 228 and 229 may be frame coded during encoding in accordance with MBAFF encoding techniques. For example, macroblock 226 may be encoded with a top field and macroblock 227 may be encoded with a bottom field during MBAFF encoding. In addition, macroblocks 228 and 229 may both be frame encoded during MBAFF encoding. In this manner, pixels along the vertical edge 221 in all odd numbered pixel rows within macroblocks 228 and 229 may correspond to pixels within pixel rows 1 through 16 within macroblock 226, which may be top field encoded. Similarly, pixels along the vertical edge 221 in even numbered pixel rows within macroblocks 228 and 229 may correspond to pixels within pixel rows 1 through 16 within macroblock 227, which may be bottom field encoded. Vertical edge 221, therefore, may be deblocked by filtering corresponding type pixels on both sides of the vertical edge 211, where pixels within the frame encoded macroblocks 228 and 229 on the left side of the vertical edge 221 may correspond to respective top or bottom field encoded pixels in macroblocks 226 and 227 on the right side of the vertical edge 221.

Figure 2D:
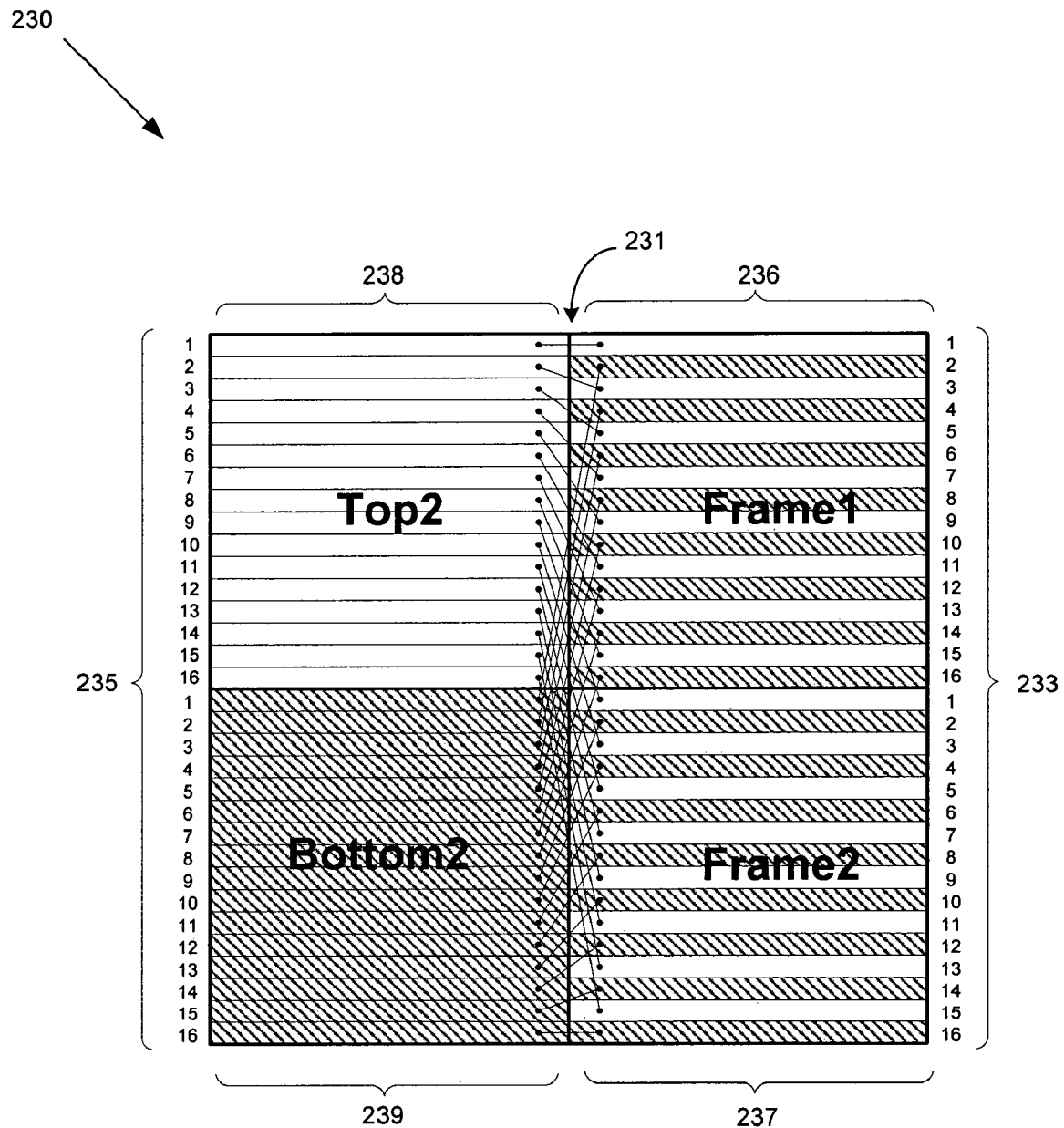
FIG. 2D is a diagram illustrating pixel processing along a vertical edge between pixels in a frame coded macroblock pair and a top-bottom field coded left neighboring macroblock pair, in accordance with an embodiment of the invention.

FIG. 2D is a diagram 230 illustrating pixel processing along a vertical edge between pixels in a frame coded macroblock pair and a top-bottom field coded left neighboring macroblock pair, in accordance with an embodiment of the invention. Referring to FIG. 2D, there is illustrated a current macroblock pair 233 and a previous macroblock pair 235 where the previous macroblock pair 235 is adjacent to the left of the current macroblock pair 233 along its vertical edge 231. Macroblock pair 233 may comprise macroblocks 236 and 237, and macroblock pair 235 may comprise macroblocks 238 and 239.

In one aspect of the invention, macroblocks 236 and 237 may be frame coded and macroblocks 238 and 239 may be field coded during encoding in accordance with MBAFF encoding techniques. For example, macroblock 238 may be encoded with a top field and macroblock 239 may be encoded with a bottom field during MBAFF encoding. In addition, macroblocks 236 and 237 may both be frame encoded during MBAFF encoding. In this manner, pixels along the vertical edge 231 in odd numbered pixel rows within macroblocks 236 and 237 may correspond to pixels within pixel rows 1 through 16 within macroblock 238, which may be top field encoded. Similarly, pixels along the vertical edge 231 in even numbered pixel rows within macroblocks 236 and 237 may correspond to pixels within pixel rows 1 through 16 within macroblock 239, which may be bottom field encoded. Vertical edge 231, therefore, may be deblocked by filtering corresponding type pixels on both sides of the vertical edge 231, where pixels within the frame encoded macroblocks 236 and 237 on the right side of the vertical edge 231 may correspond to respective top or bottom field encoded pixels in macroblocks 238 and 239 on the left side of the vertical edge 231.

Figure 3:
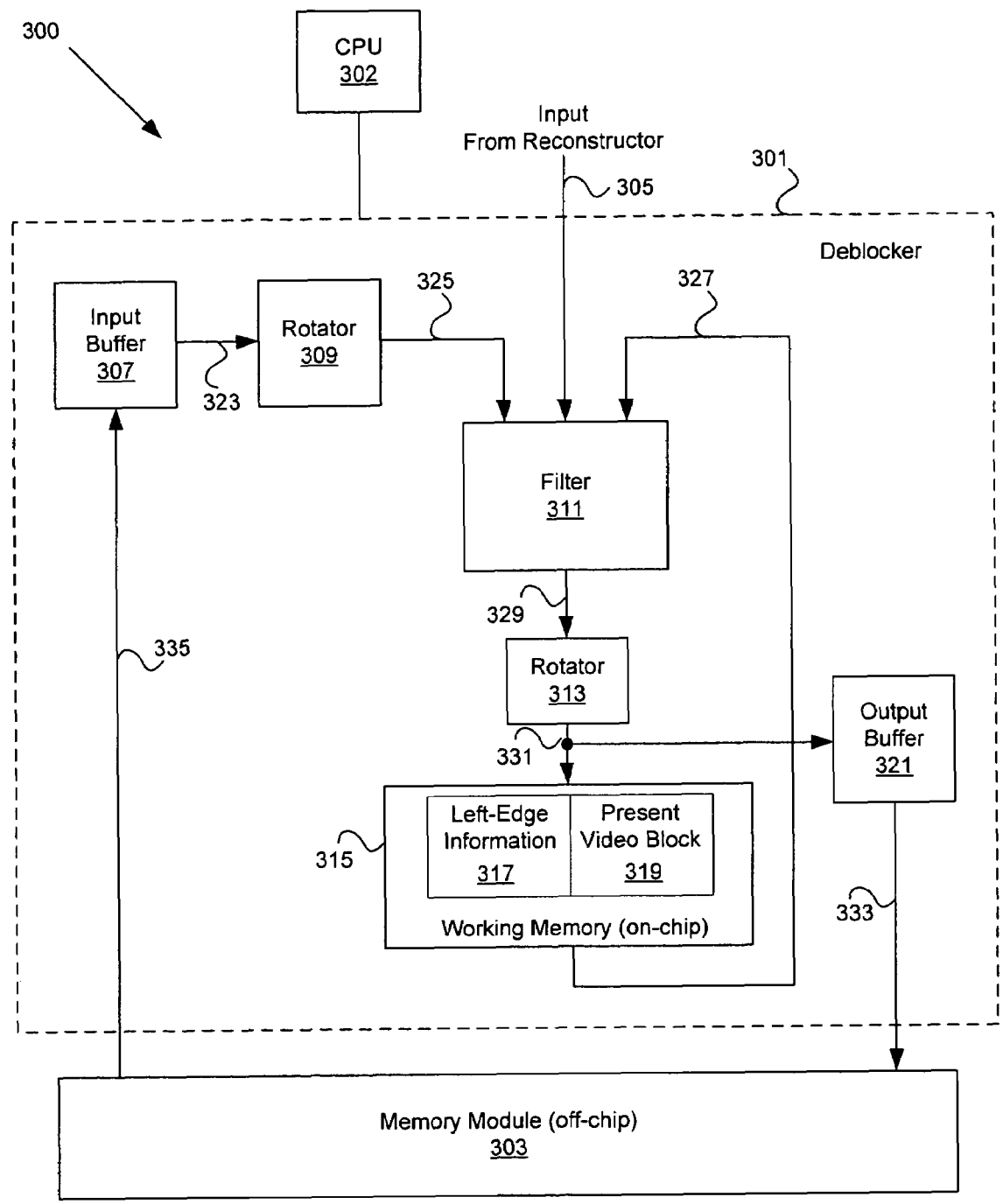
FIG. 3 is a block diagram illustrating an exemplary system for processing pixels within a current macroblock, in accordance with an embodiment of the invention.

FIG. 3 is a block diagram illustrating an exemplary system 300 for processing pixels within a current macroblock, in accordance with an embodiment of the invention. Referring to FIG. 3, the exemplary system for processing pixels 300 may comprise a central processing unit (CPU) 302, a deblocker 301 and a memory module 303. The deblocker 301 may comprise an input buffer 307, rotators 309 and 313, a filter 311, an output buffer 321 and working memory 315. The CPU 302 may be utilized within the system 300 to coordinate the deblocking process within the deblocker 301, for example.

The input buffer 307 comprises suitable circuitry, logic and/or code and may be adapted to buffer a plurality of pixels from a macroblock that is adjacent to the top of a current macroblock. Referring to FIGS. 1B and 3, the input buffer 307 may buffer pixels within the 16×4 horizontal pixel block comprising sub-blocks BT1, BT2, BT3 and BT4. In this manner, the input buffer 307 may be adapted to buffer four pixel lines to the top of the first horizontal edge of a current macroblock. The input buffer 307 may acquire the necessary pixels 335 within the top adjacent 16×4 horizontal pixel block from the memory module 303.

The rotator 309 comprises suitable circuitry, logic and/or code and may be adapted to rotate the plurality of pixels 323 acquired from the input buffer 307 prior to filtering by the filter 311. The filter 311 may be adapted to filter only pixels that are horizontally adjacent to each other. In this manner, pixels from a top adjacent horizontal block that may be stored in the input buffer 307 may be rotated 90 degrees so that the filter 311 may accept and filter the pixels from the top adjacent horizontal pixel block. After rotation, the rotator 309 may communicate the rotated pixels 325 from the top adjacent horizontal pixel block to the filter 311 for deblocking.

The filter 311 comprises suitable circuitry, logic and/or code and may be adapted to filter a plurality of pixels along one or more horizontal and/or vertical edges within a current macroblock during deblocking. Depending on whether the deblocker 301 is deblocking along a vertical edge and/or a horizontal edge and the location of the currently deblocked edge, the filter 311 may acquire a plurality of pixels 305 from, for example, a reconstructor, pixels 325 from the rotator 309 and/or pixels 327 from the working memory 315. Pixels 305 from a macroblock reconstructor may be processed as pixels within a current macroblock. Pixels 327 may comprise pixels from a macroblock adjacent to the left of the current macroblock and may be utilized during deblocking of a vertical edge within the current macroblock.

The rotator 313 comprises suitable circuitry, logic and/or code and may be adapted to rotate the plurality of filtered pixels 329 acquired from the filter 311. During deblocking of a current macroblock, pixels along vertical edges may be initially processed. After pixels along the vertical edges are filtered by the filter 311, the rotator 313 may be utilized to rotate the filtered pixels 329 so that the rotated pixels 331 may be subsequently utilized for deblocking along horizontal edges. Intermediate pixel results, such as the rotated pixels 331, may be stored in the working memory 315 and then communicated back to the filter 311 as pixels 327. After the filter 311 deblocks along all horizontal edges within the current macroblock, the rotator 313 may be utilized again to rotate the filtered pixels back to their original horizontal position. The twice-rotated filtered pixels may then be communicated to the output buffer 321 for buffering and subsequent communication to the memory module 303.

The output buffer 321 comprises suitable circuitry, logic and/or code and may be adapted to receive output video information from the rotator 313, which the output buffer 321 may then store back in the memory module 303.

The working memory 315 may be utilized by the deblocker 301 to store information of the macroblock presently being processed. The working memory 315 may, for example, comprise a first portion 319 for the storage of a present macroblock, or a sub-block, information and a second portion 317 for the storage of pixel information for macroblocks, or sub-blocks, that are adjacent to the left of the current macroblock, or sub-block. The working memory 315 may, for example, comprise static random access memory (SRAM) that may be local to the deblocker 301. For example and without limitation, the working memory 315 may comprise a standard form of memory or may comprise a memory structure specifically adapted to interface with the filter 311 or other portions of the deblocker 301. Accordingly, the scope of various aspects of the present invention should not be limited by characteristics of a particular memory structure.

Storage in the working memory 315 may be implemented in a variety of ways. For example and without limitation, information of a previous macroblock that may be utilized with information of a current macroblock for deblock processing may be moved to a sub-section of working memory 315 reserved for such information. Such a memory subsection may, for example, comprise a standard form of memory or a memory structure specifically adapted to enhance deblock processing. Alternatively, for example, working memory 315 may be divided in a plurality of sub-sections for receiving incoming macroblock information for processing. In such a scenario, information of the processed previous macroblock may be retained at its current location in a first sub-section, for example memory portion 317, while information of the current macroblock may be loaded in second sub-section of working memory, for example memory portion 319.

When the deblocker 301 no longer utilizes information of the preceding macroblock and information of a post-current macroblock arrives, such information may be stored in the first sub-section in the working memory 315, formerly occupied by information of the preceding macroblock. In this manner, the working memory 315 may store information of a processed preceding macroblock in anticipation of a need to utilize such information to process a present macroblock. Accordingly, the scope of various aspects of the present invention should not be limited by characteristics of a particular buffer memory management technique.

The memory module 303 comprises suitable circuitry and/or logic and may be adapted to store previously processed video block information that may be utilized to perform further processing, such as displaying of deblocked video information and/or deblocking of a subsequent macroblock. The memory module 303 may, for example, comprise various types of memory, such as off-chip dynamic random access memory (DRAM). During deblocking, processed video information may, for example, be stored back in the memory module 303 to be utilized in subsequent processing activities, such as for deblocking subsequent macroblocks.

In operation, the deblocker 301 may initially deblock along the leftmost vertical edge within a current macroblock. Pixels within the current macroblock may be acquired as input pixels 305 from an upstream video processor, such as a reconstructor. Pixel information 327 for a left adjacent macroblock may be communicated from the working memory 315 to the filter 311. After the filter completes deblocking along the first vertical edge, filtered information 329 may be rotated by the rotator 313 and the rotated pixel information 331 may be stored within the working memory 315 for use during deblocking of horizontal edges. After deblocking all vertical edges within the current macroblock, the deblocker 301 may proceed with deblocking the horizontal edges. Pixel information 335 for a horizontal pixel block adjacent to the top of the current macroblock may be communicated from the memory module 303 to the input buffer 307.

The buffered pixel information 323 may then be rotated by the rotator 309 and communicated as rotated pixel information 325 to the filter 311. The filter 311 may utilize the rotated pixel information 325 to deblock along the first horizontal edge. The filtered pixels 329 may be rotated again by the rotator 313 and buffered in the output buffer 321 for further processing, such as storing in the memory module 303. With regard to deblocking along the remaining horizontal edges, the filter 311 may utilize rotated pixel information 327 already stored in the working memory 315 during deblocking of the vertical edges. In this manner, a single vertical or horizontal edge in a 16×16 macroblock may be deblocked during 16 operational cycles, or a total of 256 operational cycles for each macroblock.

During an exemplary deblocking processing scenario, the deblocker 301 may, for example, have performed deblocking processing on a previous video block. Such processing may have resulted in at least a portion of a preceding macroblock being deblocked. Information of the preceding macroblock may, for example, be utilized in deblocking a current macroblock. For example, the right side pixels of a left preceding macroblock and the left side pixels of the current macroblock may be deblocked together within the filter 311. Accordingly, at least a portion of the preceding macroblock may be stored in the working memory 315, more specifically in the second memory portion 317 for left adjacent pixel information.

Information for a present macroblock may be acquired as input 305 from a reconstructor, or as a result of another upstream processing, such as decrypting, decoding, scaling, and/or blending. The deblocker 301 may, for example, analyze the incoming macroblock data to determine the type of encoding utilized to encode a present macroblock pair. For example, the deblocker 301 may determine whether the present macroblock pair was encoded utilizing frame or field coding. The deblocker 301 may also analyze a preceding macroblock pair to determine the type of encoding utilized to encode a preceding macroblock. Referring again to FIGS. 2A-2D, the deblocker 301 may determine which combination of macroblock encoding types applies to the present macroblock and to a previous macroblock.

The deblocker 301 may then, for example, utilize the determined encoding information and knowledge of the block combination scenarios, as illustrated in FIGS. 2A-2D, for example, to locate pixel information stored in the memory module 303 from the preceding macroblock pair that corresponds to left side pixel information of the present macroblock pair. The deblocker 301 may, for example, make such a determination in a variety of ways. The deblocker 301 may, for example, be hardwired to perform such processing with hardware. Alternatively for example, the deblocker 301 may utilize a CPU 302 executing software instructions that may perform a table lookup operation to determine a memory address of a desired piece of video information. Such a lookup table may, for example, be hard coded, implemented in firmware, and/or stored in on-chip SROM. For example and without limitation, the deblocker 301 may utilize MBAFF field and/or frame coding information to determine, or index to, an appropriate memory chart to utilize in obtaining appropriate left neighbor pixel information.

A deblocker, which is part of a video decoder, is also described in U.S. patent application Ser. No. 10/963,677 filed Oct. 13, 2004, which is hereby incorporated herein by reference in its entirety.

Figure 4:
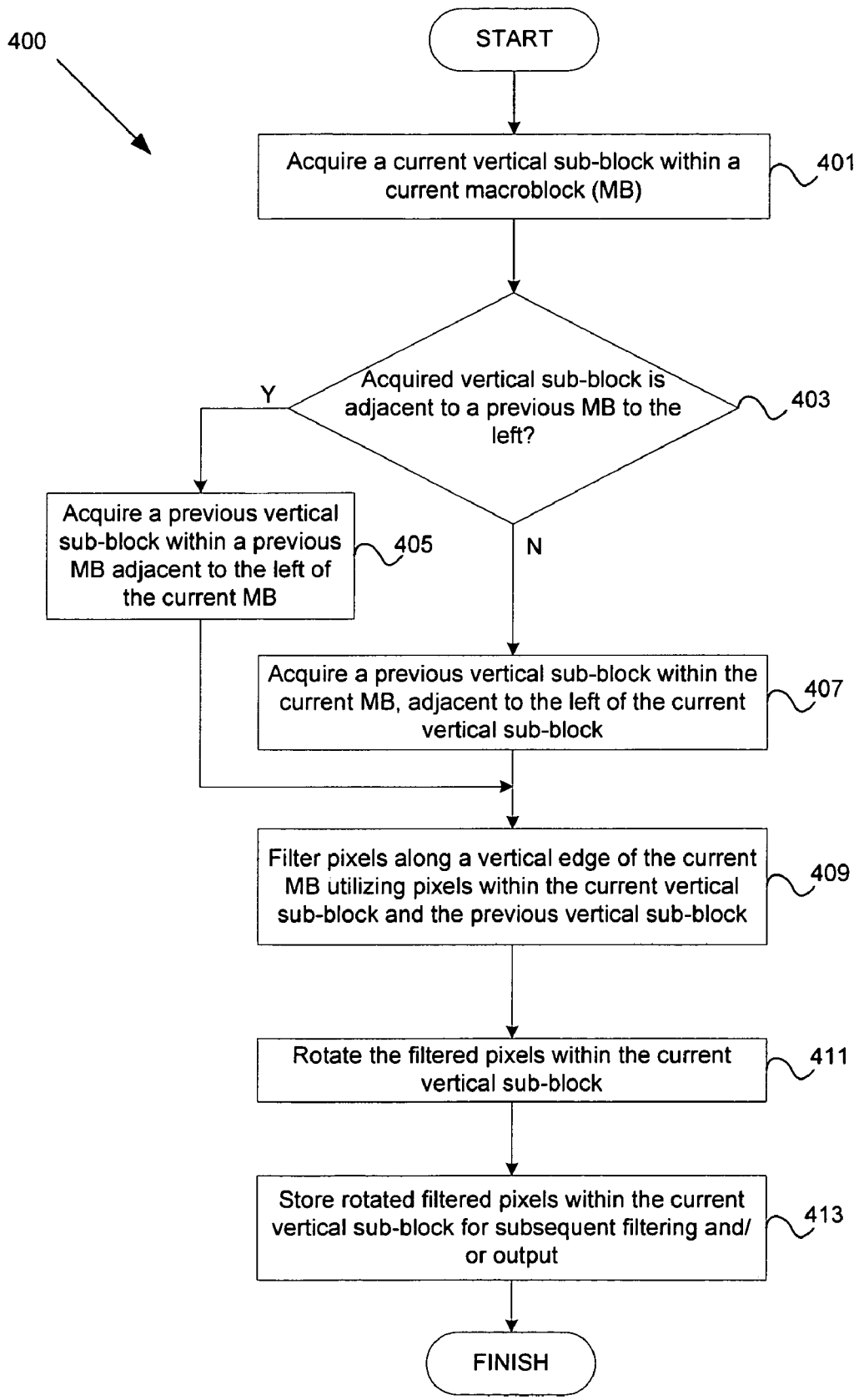
FIG. 4 is a flow diagram of an exemplary method for processing pixels along a vertical edge within a current macroblock, in accordance with an embodiment of the invention.

FIG. 4 is a flow diagram of an exemplary method 400 for processing pixels along a vertical edge within a current macroblock, in accordance with an embodiment of the invention. Referring to FIG. 4, at 401, a current vertical sub-block within a current macroblock may be acquired. The current macroblock may comprise 256 pixels in a 16×16 pixel matrix and the vertical sub-block may comprise 64 pixels in a 4×16 pixel matrix within the current macroblock. At 403, it may be determined whether the acquired vertical sub-block is adjacent to a previous macroblock to the left, or whether the acquired vertical sub-block is the left most vertical sub-block within the current macroblock.

If the acquired vertical sub-block is adjacent to a previous macroblock to the left, at 405, a previous vertical sub-block within a previous macroblock may be acquired, where the previous macroblock is adjacent to the left of the current macroblock. If the acquired vertical sub-block is not adjacent to a previous macroblock to the left, at 407, a previous vertical sub-block within the current macroblock may be acquired, where the previous vertical sub-block is adjacent to the left of the current vertical sub-block.

At 409, pixels along a vertical edge of the current macroblock may be filtered utilizing pixels within the current vertical sub-block and the previous vertical sub-block. At 411, filtered pixels within the current vertical sub-block may be rotated. For example, pixels within the current vertical sub-block may be rotated 90 degrees so that the rotated filtered pixels may be subsequently utilized for filtering along a horizontal edge within the current macroblock. At 413, the rotated filtered pixels within the current vertical sub-block may be stored for subsequent filtering along a horizontal edge of the current macroblock and/or for output to off-chip memory, for example.

Figure 5:
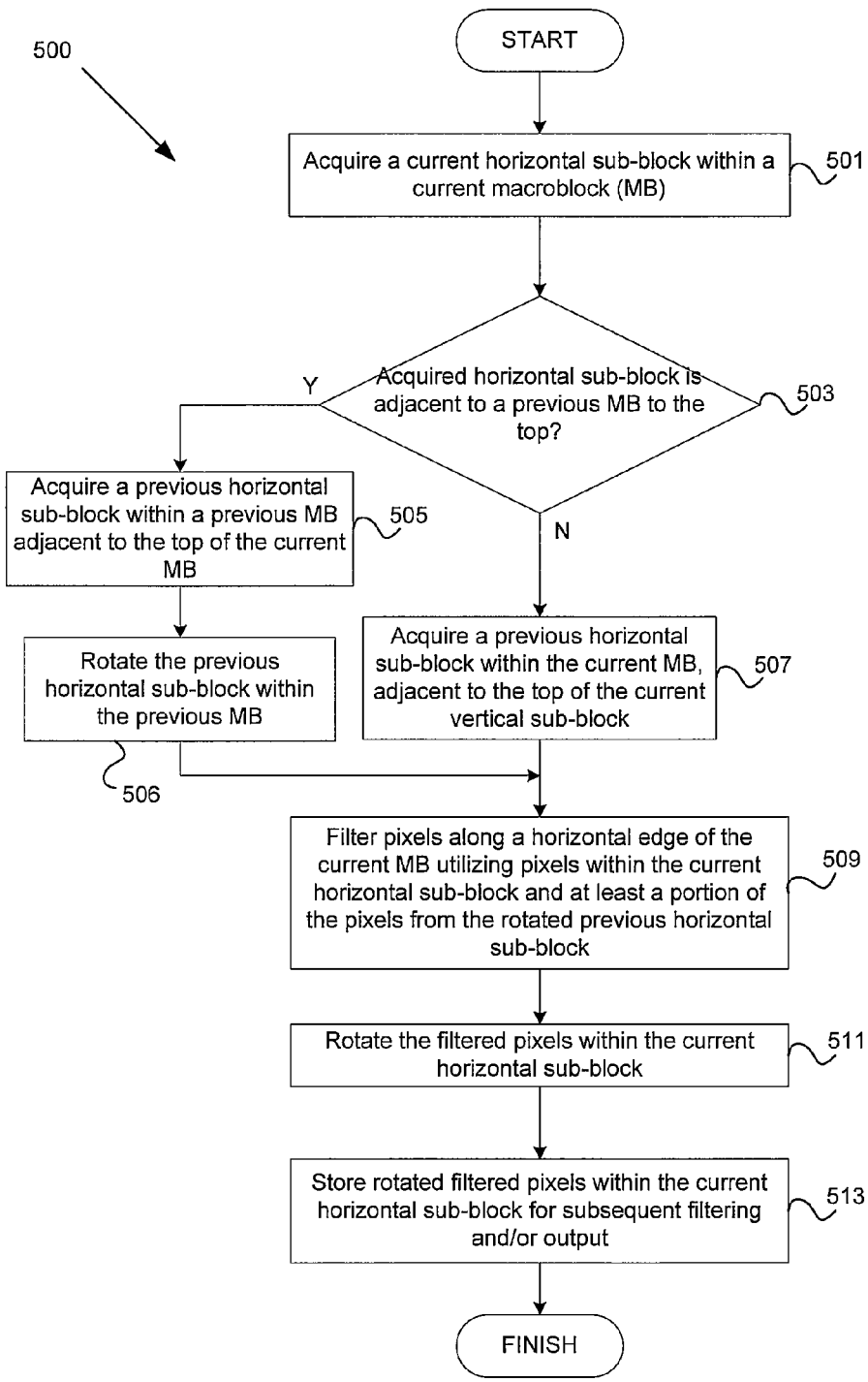
FIG. 5 is a flow diagram of an exemplary method for processing pixels along a horizontal edge within a current macroblock, in accordance with an embodiment of the invention.

FIG. 5 is a flow diagram of an exemplary method 500 for processing pixels along a horizontal edge within a current macroblock, in accordance with an embodiment of the invention. Referring to FIG. 5, at 501, a current horizontal sub-block within a current macroblock may be acquired. The current macroblock may comprise 256 pixels in a 16×16 pixel matrix and the horizontal sub-block may comprise 64 pixels in a 16×4 pixel matrix within the current macroblock. At 503, it may be determined whether the acquired horizontal sub-block is adjacent to a previous macroblock to the top, or whether the acquired horizontal sub-block is the top most horizontal sub-block within the current macroblock.

If the acquired horizontal sub-block is adjacent to a previous macroblock to the top, at 505, a previous horizontal sub-block within a previous macroblock may be acquired, where the previous macroblock is adjacent to the top of the current macroblock. At 506, the previous horizontal sub-block within the previous macroblock may be rotated so that filtering along a horizontal edge within the current macroblock may be achieved by filtering neighboring pixels in a horizontal direction. If the acquired horizontal sub-block is not adjacent to a previous macroblock to the top, at 507, a previous horizontal sub-block within the current macroblock may be acquired, where the previous horizontal sub-block is adjacent to the top of the current horizontal sub-block.

At 509, pixels along a horizontal edge of the current macroblock may be filtered utilizing pixels within the current horizontal sub-block and at least a portion of the pixels from the rotated previous horizontal sub-block within the previous macroblock. At 511, filtered pixels within the current horizontal sub-block may be rotated. For example, pixels within the current horizontal sub-block may be rotated 90 degrees so that the rotated filtered pixels may be subsequently utilized for filtering along a vertical edge within the current macroblock. At 513, the rotated filtered pixels within the current horizontal sub-block may be stored for subsequent filtering along a vertical edge of the current macroblock and/or for output to off-chip memory, for example.

Exemplary aspects of the present invention may incorporate aspects of MPEG-4 signal processing. Even though the present invention contemplates deblocking video signals that were processed utilizing MPEG-4 (e.g., MPEG-4 Part 10, H.264, AVC) signal processing, the MPEG4 scenario is generally illustrative and should not limit the scope of various aspects of the present invention to characteristics of MPEG-4 and MPEG-4 signal processing. In this manner, video signals processed by other video processing methods may also be deblocked utilizing one or more aspects of the present invention.

Accordingly, aspects of the invention may be realized in hardware, software, firmware or a combination thereof. The invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

The invention claimed is:

1. A method for processing pixels within a current macroblock, the method comprising:
deblocking the current macroblock, wherein said deblocking comprises:
acquiring a plurality of pixels that are adjacent to the left of a plurality of selected pixels within the current macroblock;
vertical filtering along a vertical edge at least a portion of said plurality of selected pixels within the current macroblock utilizing at least a portion of said acquired plurality of pixels that are adjacent to the left of said plurality of selected pixels;
rotating said filtered at least a portion of said plurality of selected pixels within the current macroblock; and
horizontal filtering along a horizontal edge of the current macroblock, utilizing at least a portion of said rotated filtered at least said portion of said plurality of selected pixels.

2. The method according to claim 1, comprising acquiring a plurality of pixels that are adjacent to the top of said plurality of selected pixels within the current macroblock.

3. The method according to claim 2, comprising rotating said acquired plurality of pixels that are adjacent to the top of said plurality of selected pixels.

4. The method according to claim 3, comprising filtering along a horizontal edge at least a portion of said plurality of selected pixels within the current macroblock utilizing at least a portion of said rotated plurality of pixels that are adjacent to the top of said plurality of selected pixels.

5. The method according to claim 1, wherein said acquired plurality of pixels comprises at least 4 pixels.

6. The method according to claim 1, wherein said plurality of selected pixels within the macroblock comprises at least 4 pixels.

7. The method according to claim 1, comprising storing said at least a portion of said plurality of selected pixels filtered along said vertical edge.

8. The method according to claim 7, comprising acquiring a plurality of pixels that are adjacent to the right of said stored at least a portion of said plurality of selected pixels.

9. The method according to claim 8, comprising storing said acquired plurality of pixels that are adjacent to the right of said stored at least a portion of said plurality of selected pixels.

10. The method according to claim 9, comprising filtering along a subsequent vertical edge at least a portion of said stored acquired plurality of pixels that are adjacent to the right of said stored selected pixels utilizing at least a portion of said stored selected pixels.

11. A machine-readable storage having stored thereon, a computer program having at least one code section for processing pixels within a current macroblock, the at least one code section being executable by a machine to perform steps comprising
deblocking the current macroblock, wherein said deblocking comprises:
acquiring a plurality of pixels that are adjacent to the left of a plurality of selected pixels within the current macroblock;
vertical filtering along a vertical edge at least a portion of said plurality of selected pixels within the current macroblock utilizing at least a portion of said acquired plurality of pixels that are adjacent to the left of said plurality of selected pixels;
rotating said filtered at least a portion of said plurality of selected pixels within the current macroblock; and
horizontal filtering along a horizontal edge of the current macroblock, utilizing at least a portion of said rotated filtered at least said portion of said plurality of selected pixels.

12. The computer-readable medium according to claim 11, comprising code for acquiring a plurality of pixels that are adjacent to the top of said plurality of selected pixels within the current macroblock.

13. The computer-readable medium according to claim 12, comprising code for rotating said acquired plurality of pixels that are adjacent to the top of said plurality of selected pixels.

14. The computer-readable medium according to claim 13, comprising code for filtering along a horizontal edge at least a portion of said plurality of selected pixels within the current macroblock utilizing at least a portion of said rotated plurality of pixels that are adjacent to the top of said plurality of selected pixels.

15. The computer-readable medium according to claim 11, wherein said acquired plurality of pixels comprises at least 4 pixels.

16. The computer-readable medium according to claim 11, wherein said plurality of selected pixels within the macroblock comprises at least 4 pixels.

17. The computer-readable medium according to claim 11, comprising code for storing said at least a portion of said plurality of selected pixels filtered along said vertical edge.

18. The computer-readable medium according to claim 17, comprising code for acquiring a plurality of pixels that are adjacent to the right of said stored at least a portion of said plurality of selected pixels.

19. The computer-readable medium according to claim 18, comprising code for storing said acquired plurality of pixels that are adjacent to the right of said stored at least a portion of said plurality of selected pixels.

20. The computer-readable medium according to claim 19, comprising code for filtering along a subsequent vertical edge at least a portion of said stored acquired plurality of pixels that are adjacent to the right of said stored selected pixels utilizing at least a portion of said stored selected pixels.

21. A system for processing pixels within a current macroblock, the system comprising:
at least one processor that deblocks the current macroblock, wherein said deblocking comprises:
said at least one processor that acquires a plurality of pixels that are adjacent to the left of a plurality of selected pixels within the current macroblock;
said at least one processor vertically filters along a vertical edge at least a portion of said plurality of selected pixels within the current macroblock utilizing at least a portion of said acquired plurality of pixels that are adjacent to the left of said plurality of selected pixels;
said at least one processor rotates said filtered at least a portion of said plurality of selected pixels within the current macroblock; and
said at least one processor horizontally filters along a horizontal edge of the current macroblock, utilizing at least a portion of said rotated filtered at least said portion of said plurality of selected pixels.

22. The system according to claim 21, wherein said at least one processor acquires a plurality of pixels that are adjacent to the top of said plurality of selected pixels within the current macroblock.

23. The system according to claim 22, wherein said at least one processor rotates said acquired plurality of pixels that are adjacent to the top of said plurality of selected pixels.

24. The system according to claim 23, wherein said at least one processor filters along a horizontal edge at least a portion of said plurality of selected pixels within the current macroblock utilizing at least a portion of said rotated plurality of pixels that are adjacent to the top of said plurality of selected pixels.

25. The system according to claim 21, wherein said acquired plurality of pixels comprises at least 4 pixels.

26. The system according to claim 21, wherein said plurality of selected pixels within the macroblock comprises at least 4 pixels.

27. The system according to claim 21, wherein said at least one processor stores said at least a portion of said plurality of selected pixels filtered along said vertical edge.

28. The system according to claim 27, wherein said at least one processor acquires a plurality of pixels that are adjacent to the right of said stored at least a portion of said plurality of selected pixels.

29. The system according to claim 28, wherein said at least one processor stores said acquired plurality of pixels that are adjacent to the right of said stored at least a portion of said plurality of selected pixels.

30. The system according to claim 29, wherein said at least one processor filters along a subsequent vertical edge at least a portion of said stored acquired plurality of pixels that are adjacent to the right of said stored selected pixels utilizing at least a portion of said stored selected pixels.

* * * * *